Figure 1:
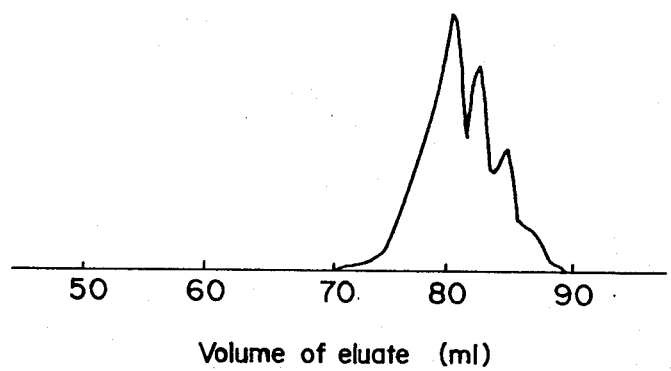

United States Patent [19]

Iwai et al.

[11] 4,377,677

[45] Mar. 22, 1983

[54] METHOD OF PREPARING POLYCARBOSILANES

[75] Inventors: Tadashi Iwai; Takashi Kawahito; Masahiro Tokuse, all of Ube, Japan

[73] Assignee: Ube Industries, Ltd., Ube, Japan

[21] Appl. No.: 318,596

[22] Filed: Nov. 5, 1981

[30] Foreign Application Priority Data

Nov. 11, 1980 [JP] Japan .................... 55-157695

[51] Int. Cl.$^3$ ............................................. C08G 77/60
[52] U.S. Cl. ...................................... 528/35; 528/16; 528/18; 528/24; 528/33; 556/430; 556/435
[58] Field of Search .................. 556/435, 430; 528/35, 528/33, 16, 18, 24

[56] References Cited

U.S. PATENT DOCUMENTS 4,310,482 1/1982 Baney ....................................... 528/35

OTHER PUBLICATIONS

Patents Abstracts of Japan vol. 3, No. 104 (Sep. 4, 1979), p. 76 C 57 which is an abridgement of JP-A-54-83099, Feb./1978.

Primary Examiner—Melvyn I. Marquis
Attorney, Agent, or Firm—Frishauf, Holtz, Goodman & Woodward

[57] ABSTRACT

A method of preparing polycarbosilanes having high molecular weight and also having the major structural unit of silicon-carbon linkage. The method comprises heating a polysilane at 50°–600° C. in atmosphere of an inert gas and distilling out a low molecular weight polycarbosilane fraction having the number mean molecular weight of 300–600, followed by polymerizing the fraction by heating it at 250°–500° C. in atmosphere of an inert gas. The polycarbosilane obtained by the method of the present invention is useful for the precursor of preparing silicon carbide fibres and shaped articles.

10 Claims, 2 Drawing Figures

Volume of eluate (ml)

Volume of eluate (ml)

METHOD OF PREPARING POLYCARBOSILANES

The present invention relates to an improved method of preparing polycarbosilanes having high molecular weight and also having the major structural unit of silicon-carbon linkage, by using a polysilane as the starting material.

Polycarbosilanes are known to be useful as the precursor of silicon carbide fibres and shaped articles, as they may be converted to silicon carbide by baking them.

Heretofore, pressure vessels such as autoclave or circulating flow vessels have been employed in the preparation of polycarbosilanes from polysilanes. However, in the case of using former vessels, the reaction must be performed at high temperature and pressure, say, at 400°–480° C. and 80–130 atmospheric pressure, for more than 10 hours; hence pressure-resistant facilities and countermeasure for hazzard are required. In the case of using latter vessels, the reaction must be performed at high temperature for a long period of time, say, at 600°–800° C. for 20–50 hours. Further, separation from and circulation into vessel of the products having low molecular weight are necessitated; hence complication of facilities and poor production efficiency are unavoidable.

The present inventors have made intensive studies to improve the above-mentioned defects involved in conventional methods and found a method of preparing polycarbosilanes from a polysilane at relatively low temperature and at around normal pressure for a shorter period of time.

The invention, therefore, relates to a method of preparing polycarbosilanes having high molecular weight and also having the major structural unit of silicon-carbon linkage, which method comprising heating a polysilane at 50°–600° C. in an atmosphere of an inert gas, distilling out a low molecular weight polycarbosilane fraction having the number mean molecular weight of 300–600, followed by polymerizing the fraction by heating it at 250°–500° C. in atmosphere of an inert gas.

Polysilanes used for the starting material in the present method may be obtained by dechlorinating and condensing a monosilane (such as dimethyldichlorosilane, diphenyldichlorosilane, methylphenyldichlorosilane, trichloromethylsilane, trichlorophenylsilane, methyldichlorosilane or phenyldichlorosilane) with metallic sodium or lithium. The polysilane thus prepared usually includes impurities such as sodium chloride or lithium chloride. They may be used, however, as such without thorough purification for the method of the invention.

Polysilanes are represented by the following structural unit:

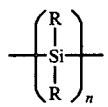

(in which R represents a lower alkyl group, a phenyl group or a hydrogen atom and n is an integer of 3 or more).

Especially preferred polysilanes include those whose side chains are substantially composed of methyl groups, or more than 50% of the side chains are methyl groups and the remainder being phenyl groups and/or hydrogen atoms.

In the case of straight chain polysilanes, the terminal groups are preferably hydroxy or methyl groups.

The method of the invention may be performed once by collecting, outside of the reaction system, a fraction that is distilled out by heating a polysilane at 50°–600° C., particularly 150°–500° C., at around normal pressure, followed by polymerizing the fraction by heating it at more than 250° C., particularly 300°–500° C., at around normal pressure.

The heat treatment in the first step and the heat polymerization in the second step are preferably performed in an atmosphere of an inert gas, such as nitrogen, argon, helium or hydrogen.

The reactions are preferably performed at around normal pressure, although they may be performed either applying a bit of pressure or under slightly reduced pressure.

The heat treatment at excessively lower or higher temperature should be avoided. If it is performed at below 50° C., the conversion rate of polysilane to low molecular weight carbosilane will slow down. On the contrary, if it is performed at above 600° C., the molecular weight of the resulting carbosilane will be extremely small, and the yield will decrease.

The fraction distilled out at 50°–600° C. by heating a polysilane may be obtained in the form of a gas or a liquid. In the case of a gas, it may be collected, outside of the reaction system, by cooling and condensing it.

The fraction comprises chiefly the following two structural units:

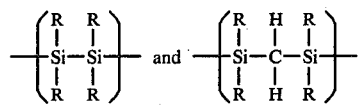

(in which R represents a lower alkyl group, a phenyl group or a hydrogen atom).

The ratio of the former to the latter is 1–6:1.

The low molecular weight carbosilane has the number mean molecular weight of 300–600, and has a quite narrow molecular weight distribution, it is of high purity and is almost colorless, transparent and slightly viscous liquid at ambient temperature.

The low molecular weight carbosilane fraction having the number mean molecular weight of 300–600 thus collected outside of the reaction system is then polymerized by heating it to prepare a high molecular weight polycarbosilane having the major structural unit of carbon-silicon linkage.

There is no special limitation as to the heat polymerization conditions. Generally, it is preferred that the reaction is performed at temperature of 250°–500° C. and at around normal pressure in an atmosphere of an inert gas.

It is not preferable to perform the polymerization reaction at excessively higher or lower temperature. If the reaction is performed at below 250° C., it will proceed quite slowly. On the contrary, if it is performed at above 500° C., the polycarbosilane produced will become degraded.

The reaction will be usually complete for 2–10 hours.

The reaction itself is known and may be performed in the presence of a radical reaction initiator such as benzoyl peroxide or di-t-butyl peroxide, a catalyst such as those containing aluminum or boron, or under irradiation.

The polycarbosilane having high molecular weight and also having the major structural unit of siliconcarbon linkage is a transparent, pale yellowish substance. It comprises the linkage units

and the number mean molecular weight is 1,000–2,500, with a distribution which is relatively narrow.

In the method of the present invention to prepare polycarbosilanes having high molecular weight, a liquid, low molecular weight polycarbosilane distilled out from the reaction system by heating a polysilane as the starting material is used for the material of polymerization reaction. This is in contrast to conventional methods of preparing polycarbosilanes in which a polysilane is used as such for the starting material of polymerization reaction. The method of the invention has advantages over the prior art methods that no purifications of the starting polysilane and the produced polycarbosilane is needed and that polymerization may be performed at relatively low temperature. Further, in the case of using a solid, powder polysilane as the starting material, which is most suitable for the preparation of polycarbosilane having high molecular weight, the volume of polymerization apparatus may be minimized by using the method of the invention as opposed to conventional methods in which a polysilane is directly subjected to polymerization reaction.

In addition, the polycarbosilane obtained by the method of the present invention are useful for the precursor of preparing silicon carbide fibres and shaped articles. For instance, in preparing a silicon carbide fibre by spinning and baking it, no purification and condensation thereof are required at all; the spinning properties are quite excellent; and the mechanical strength of the product silicon carbide fibre is remarkably improved, as opposed to the preparation of silicon carbide fibre by using a polycarbosilane obtained by prior art methods.

PREPARATION 1

In a 5 l four-necked flask 2 l of xylene and 410 g of metallic sodium were placed and the sodium was dissolved by heating. The sodium was then dispersed thoroughly with vigorous stirring, during which 1,080 g of dimethyldichlorosilane were added dropwise under a stream of argon gas. Upon completion of the addition, the mixture was refluxed for 10 hours. At the end of the period, there was produced a blackish violet precipitate, which was collected by filtration. Unreacted sodium was washed and removed with methanol, and the precipitate was washed with water and dried to yield 410 g of polydimethylpolysilane in the form of a white powder.

An aliquot of the polysilane was washed with water; silver nitrate was added to the washing, which turned turbid a little, indicating the presence of a small amount of sodium chloride.

EXAMPLE 1

In a 500 ml three-necked flask equipped with a gas introduction tube, a stirrer, a cooler and a distillation tube, 100 g of polydimethylpolysilane obtained in Preparation 1 were placed. Nitrogen was introduced to the flask at the rate of 50 ml/min, during which the mixture was heated at 420° C. with stirring to give 87 g of a pale yellowish green slightly viscous liquid in a receiver. There remained 5 g of a light brown solid in the flask.

Molecular weight distribution and number mean molecular weight of the liquid were determined by liquid chromatography and vapor pressure equilibrium method, respectively, in order to investigate its properties. Also, the structural unit was identified by IR spectroscopy.

Consequently, it turned out that the molecular weight distribution was sharp as indicated in FIG. 1, and the number mean molecular weight was 511.

The IR spectroscopy revealed absorptions at 2100 cm$^{-1}$ assigned to Si—H, 1400 cm$^{-1}$ assigned to Si—CH$_3$ and 1350 cm$^{-1}$ assigned to Si—CH$_2$—Si, besides absorptions assigned to the polysilane, thus showing that the low molecular weight polysilane was composed of 3:1 structural units of

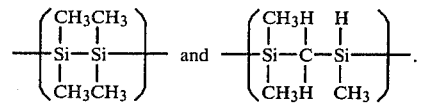

Figure 2:
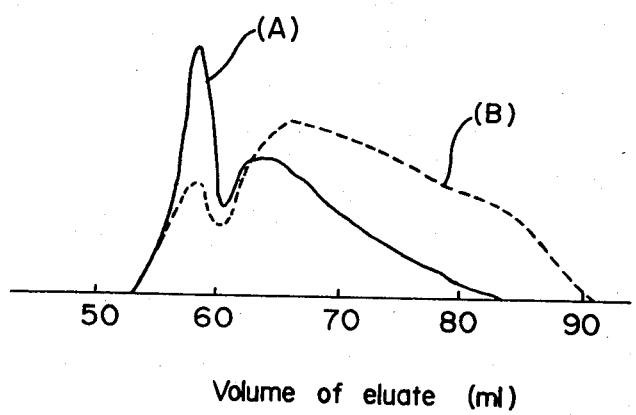

In a 200 ml three-necked flask equipped with a gas introduction tube, a stirrer and a reflux condenser, 38 g of the thus obtained low molecular weight polycarbosilane were placed. To the flask were added 1.5 g of polyborodiphenylsiloxane, as catalyst, prepared from diphenyldichlorosilane and boric acid, and the mixture was heated at 340° C. and at normal pressure for 4 hours, giving 30 g of a solid, high molecular weight carbosilane. The number mean molecular weight was 1,860 and the molecular weight distribution was relatively narrow as shown in FIG. 2, the line (A).

The polycarbosilane was of a high quality, which was introduced to a spinning machine, without any purification, melted by heating it at 240° C. and melt-spun into the air at the rate of 300 m/min to give a fibre of a diameter of 18μ.

The fibre was gradually heated in the air from room temperature to 120° C. at the rate of 12° C./hr, then maintained at 120° C. for one hour to impart infusibility to it. The fibre was then further heated up to 1200° C. under nitrogen stream over 12 hours and baked at 1200° C. for one hour to give a silicon carbide fibre having a diameter of 17μ, a tensile strength of 320 Kg/mm$^2$ and a modulus of elasticity of 12 ton/mm$^2$.

EXAMPLE 2

100 g of polydimethylpolysilane obtained in Preparation 1 were heated at 480° C. in the same apparatus as in Example 1 to give 80 g of a low molecular weight polycarbosilane fraction, leaving 3 g of residue in the flask. The number mean molecular weight of the fraction was 434. 30 g of the low molecular weight polycarbosilane and 1 g of polyborosiloxane were heated at 300° C. for 7 hours to give 22 g of a solid, high molecular weight polycarbosilane having the number mean molecular weight of 1573. The polycarbosilane was of a good spinning property, without any purification, which was melt-spun into the air at the rate of 500 m/min to give a fibre having a diameter of 10μ. The fibre was gradually heated in the air from room temperature to 110° C. at the rate of 30° C./hr, then maintained at 110° C. for 30 minutes to impart infusibility to it. The fibre was then heated in vacuo up to 1300° C. over 6.5 hours, baked at 1300° C. for one hour to give a silicon carbide fibre having a diameter of 9μ, a tensile strength of 570 Kg/mm² and a modulus of elasticity of 25 ton/mm².

EXAMPLE 3

A mixture of 30 g of low molecular weight organic silicon compound obtained in Example 1 and 1.2 g of polyborosiloxane was heated at 280° C. for 12 hours to give 23 g of a solid, high molecular weight polycarbosilane having the number mean molecular weight of 1,900.

The polymer was melt-spun into the air, without any purification, at the rate of 300 m/min. to give a fibre having a diameter of 13μ. The fibre was then heated in the air from room temperature to 110° C. at the rate of 15° C./hr, then maintained at 110° C. for one hour to impart infusibility to it.

The fibre was further heated under nitrogen stream up to 1,200° C. over 12 hours, then baked at 1,200° C. for one hour to give a silicon carbide fibre having a diameter of 12μ, a tensile strength of 530 Kg/mm² and a modulus of elasticity of 20 ton/mm².

COMPARATIVE EXAMPLE 1

In a reaction vessel having an outer diameter of 12 cm and a length of 30 cm, equipped with a gas introduction tube, a stirrer and a reflux condenser, 100 g of polysilane obtained in Preparation 1 and 4 g of polyborosiloxane were placed. The mixture was heated under nitrogen stream at 340° C. for 10 hours, with stirring, to complete the reaction. There were obtained 60 g of a solid polycarbosilane containing a small amount of insolubles.

This was melt-spun, without any purification, in the same manner as in Example 1. It was observed, consequently, that the polycarbosilane melted at 250° C. but that, upon spinning, the fibre was frequently cut owing to the insolubles.

COMPARATIVE EXAMPLE 2

A part of the solid polycarbosilane containing a small amount of insolubles obtained in Comparative Example 1 was dissolved in benzene. The insolubles were filtered off and the benzene was distilled off to give a polycarbosilane containing no insolubles. The molecular weight distribution of the polymer is broader, as shown in FIG. 2, the line (B), than that of the polycarbosilane obtained in Example 1 shown in FIG. 2, the line (A).

The polycarbosilane was then melt-spun, in the same manner as in Example 1, at the rate of 300 m/min. to give a fibre having a diameter of 20μ, almost with no cutting of the fibre upon spinning.

The fibre was subjected to infusion and baked to give a silicon carbide fibre having a diameter of 19μ, a tensile strength of 100 Kg/mm² and a modulus of elasticity of 7 ton/mm².

COMPARATIVE EXAMPLE 3

A polymerization reaction was conducted in the same manner as in Comparative Example 1, except that it was performed at 280° C. for 12 hours in place of at 340° C. for 10 hours. After cooling at room temperature, benzene was added to the reaction mixture, insolubles or polysilane was filtered off and the benzene was distilled out. There was thus obtained almost no polycarbosilane, showing that no polymerization reaction took place at all.

We claim:

1. A process of preparing polycarbosilanes having high molecular weight and having the repetitive silicon-carbon-silicon linkage as the major structural unit, which comprises heating a polysilane having the repetitive silicon-silicon linkage as the major structural unit at 50°-600° C. in an atmosphere of an inert gas and distilling out a low molecular weight polycarbosilane fraction having the number mean molecular weight of 300-600, and then polymerizing said distilled fraction by heating it at 250°-500° C. in atmosphere of an inert gas to form said high molecular weight polycarbosilane.

2. The process of claim 1, wherein said polysilanes comprise the following structural unit:

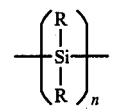

wherein R is a lower alkyl group, a phenyl group or a hydrogen atom and n is an integer which is at least 3.

3. The process of claim 2, wherein said fraction containing said low molecular weight polycarbosilane comprises polysilane having the following structural unit (I) and polycarbosilane having the following structural unit (II):

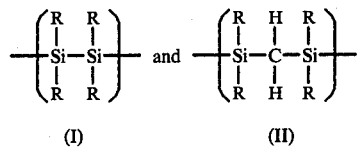

wherein R is a lower alkyl group, a phenyl group or a hydrogen atom and wherein the ratio of said polysilane to said polycarbosilane being from 1:1 to 6:1.

4. The method of claim 2, wherein said R groups are substantially methyl groups.

5. The process of claim 3 or 4, wherein said heating and distillation is at a temperature between 150°-500° C. and at around normal pressure.

6. The process of claim 5, wherein said polymerization is carried out at a temperature of between about 300°-500° C. and at around normal pressure.

7. The process of claim 3 or 4, wherein said polymerization is carried out at a temperature of between about 300°-500° C. and at around normal pressure.

8. The process of claim 7, wherein said high molecular weight polycarbosilane has a number mean molecular weight of between 1000-2,500 and wherein said R groups are methyl groups.

9. The process of claim 3 or 4, wherein said high molecular weight polycarbosilane has a number mean molecular weight of between 1000-2,500 and wherein said R groups are methyl groups.

10. The process of claim 6, wherein said high molecular weight polycarbosilane has a number mean molecular weight of between 1,573-1,900 and wherein said R groups are methyl groups.

* * * * *